United States Patent
Timon et al.

[11] Patent Number: 6,126,133
[45] Date of Patent: Oct. 3, 2000

[54] SLIDE RAIL FOR VEHICLE SEAT AND SEAT COMPRISING SUCH A SLIDE RAIL

[75] Inventors: Michel Timon, Fleury sur Orne; Pierre Moradell Casellas, Saint Georges des Groseillers, both of France

[73] Assignee: Bertrand Faure Equipements SA, Boulogne, France

[21] Appl. No.: 09/298,779

[22] Filed: Apr. 23, 1999

[30] Foreign Application Priority Data

Apr. 23, 1998 [FR] France .................................. 98 05091

[51] Int. Cl.$^7$ .................................................. F16M 13/00
[52] U.S. Cl. ........................................................ 248/429
[58] Field of Search ................................... 248/424, 429, 248/430; 296/65.14; 297/341

[56] References Cited

U.S. PATENT DOCUMENTS

| | | | |
|---|---|---|---|
| 4,711,589 | 12/1987 | Goodbred | 248/429 X |
| 5,813,726 | 9/1998 | Husted | 248/429 X |
| 5,931,436 | 8/1999 | Rohee | 248/430 |

FOREIGN PATENT DOCUMENTS

| | | |
|---|---|---|
| 0 589 731 | 3/1994 | European Pat. Off. . |
| 0 642 946 | 3/1995 | European Pat. Off. . |
| 2 759 330 | 8/1998 | France . |
| 419 159 | 11/1934 | United Kingdom . |

OTHER PUBLICATIONS

French Preliminary Search Report dated Jan. 28, 1999, French Appl. No. FR9805091.

English abstract of EP 0 642 946 from esp@cenet of the European Patent Office.

English abstract of EP 0 589 731 from esp@cenet of the European Patent Office.

English abstract of FR 2 759 330 from esp@cenet of the European Patent Office.

*Primary Examiner*—Ramon O. Ramirez
*Attorney, Agent, or Firm*—Marshall, O'Toole, Gerstein, Murray & Borun

[57] ABSTRACT

This concerns a slide rail for a vehicle seat, comprising a fixed section, a mobile section sliding on the section, and a catch movable vertically between a locked position and an unlocked position allowing the mobile section to slide. The catch is controlled by a rigid rod in the shape of a crankshaft which pivots on the mobile section and which slides in an inclined groove integral with a slider which is movable transversally on the mobile section.

11 Claims, 4 Drawing Sheets

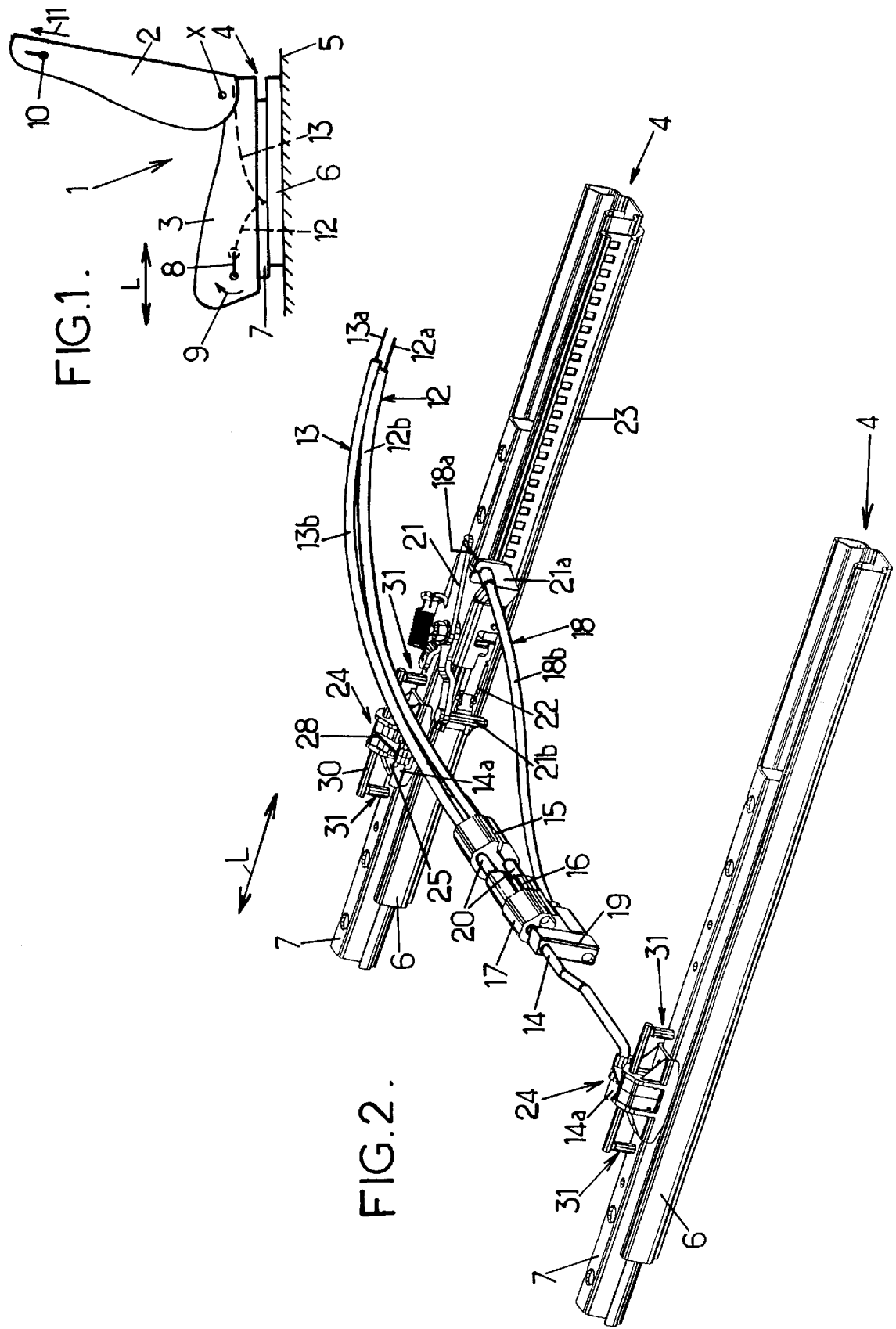

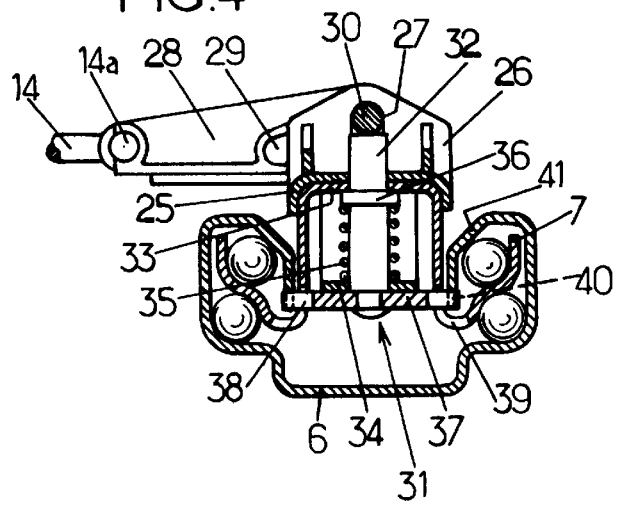
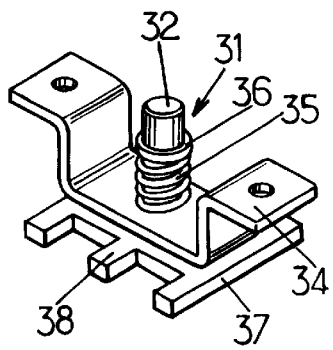
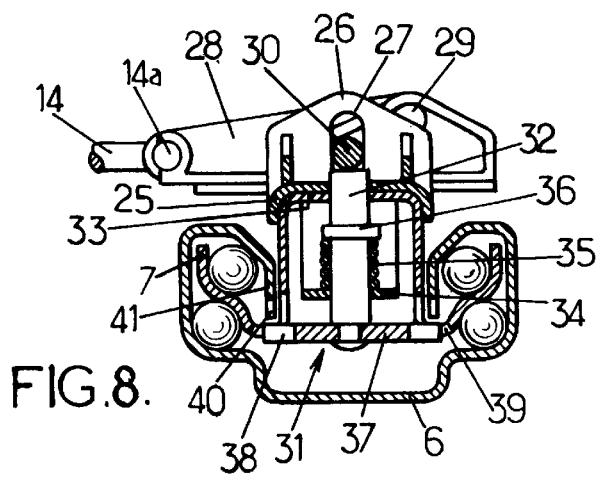
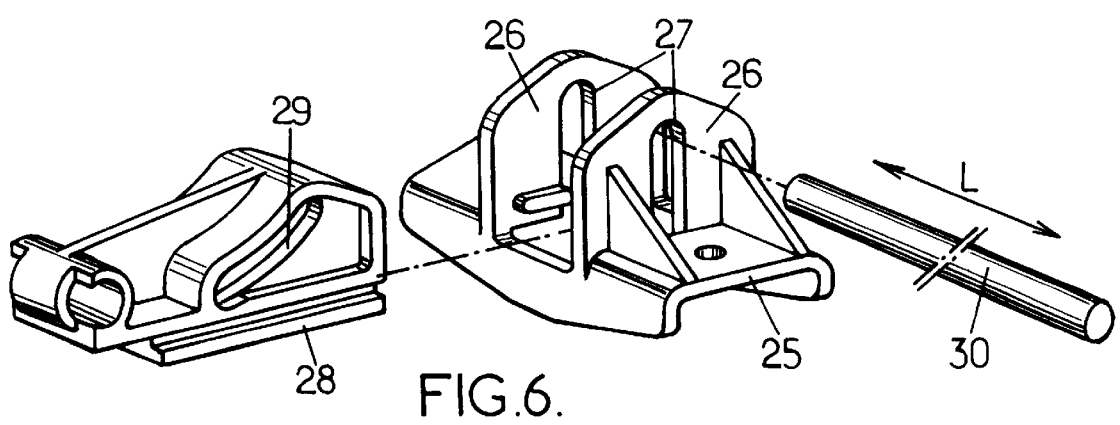

(12) United States Patent 6,126,133

SLIDE RAIL FOR VEHICLE SEAT AND SEAT COMPRISING SUCH A SLIDE RAIL

FIELD OF THE INVENTION

The present invention relates to slide rails for vehicle seats and to seats comprising such slide rails.

More particularly, the invention concerns a slide rail for a vehicle seat, comprising:

- a fixed section, which extends in a so-called longitudinal direction and which is intended to be fixed to the floor of the vehicle,
- a mobile section, which is intended to be fixed to the seat part of the seat and which is sliding mounted along the fixed section in said longitudinal direction,
- at least one catch which is mounted on the mobile section and which is movable between, on the one hand, a locked position wherein said catch engages with the fixed section to lock the mobile section, and on the other hand, an unlocked position wherein said catch does not engage with the fixed section and allows the mobile section to slide, the slide rail catch being pulled resiliently to its locked position, and said catch comprising at least one activating part which is movable approximately vertically when the catch is moved between its locked and unlocked positions,
- and an operating mechanism engaging with the activating part of the catch, this operating mechanism being able to be activated to move the catch at least to its unlocked position.

BACKGROUND OF THE INVENTION

In known slide rails of this type, the operating mechanism comprises at least one pivoting component which acts on the activating part of the catch.

Because this pivoting component may be accessed outside the slide rail, it may possibly be activated unintentionally, for example if the vehicle is involved in an accident (impact from unsecured luggage or some other object, crushing of the seat passenger into the seat part from the impact caused by the accident, etc.).

In this case, the accidental unlocking of the slide rail may have very serious consequences for the seat passenger.

OBJECTS AND SUMMARY OF THE INVENTION

The particular object of the present invention is to overcome this drawback.

To this end, according to the invention, a slide rail of the type in question is essentially characterized in that the catch operating mechanism comprises at least:

- a slider which is sliding mounted horizontally on the mobile section along a transverse direction relative to said longitudinal direction, between a neutral position and an active position,
- an activating component which is movable at least vertically between on the one hand, an up position where said activating component allows the catch to be put into its locked position, and on the other hand, a down position where said activating component acts on the activating part of the catch to put said catch into its unlocked position, this activating component being connected mechanically simultaneously with the mobile section and with the slider, so that the activating component is in its up position when the slider is in its neutral position, and so that said activating component is in its down position when the slider is in its active position,
- and means to act horizontally on the slider so as to move it between its neutral position and its active position.

By means of these arrangements, the slide rail unlocking control involves only a horizontal movement of the slider in the transverse direction, which prevents any interference with the slide rail environment in the event of the vehicle being involved in an accident.

Indeed, in the event of an accident, the movement of objects due to inertia generally occurs in the longitudinal direction, and distortions of the seat part due to the seat passenger being crushed occur approximately vertically, with the result that neither these movements of objects, nor these distortions, can cause the accidental unlocking of the slide rail.

In preferred versions of the invention, use may possibly be made additionally of one and/or other of the following arrangements:

- the operating mechanism additionally comprises a first non horizontal guide path which is fixed to the slider and along which the activating component slides, the first guide path being configured so that the activating component is in its up position when the slider is in its neutral position, and so that said activating component is in its down position when the slider is in is active position thus, the force that the seat passenger has to exert in order to activate the slide rail catch may be easily controlled throughout the travel of said catch at the design stage of the slide rail, through an appropriate choice of shape of the first guide path;
- the operating mechanism additionally comprises a guide which is fixed to the mobile section and which includes a second guide path not horizontal and not parallel to the first guide path, the activating component being sliding mounted simultaneously along first and second guide paths;
- the first guide path extends at an angle relative to the horizontal, whereas the second guide path extends approximately vertically;
- the first and second guide paths are grooves provided respectively in the slider and in the guide, the activating component being in the form of an activating rod penetrating simultaneously into the grooves constituting the first and second guide paths, and this activating rod being placed so as to be supported on the activating component of the catch at least when said activating rod is in its down position;
- the activating rod is a rectilinear rod which extends approximately horizontally in the longitudinal direction;
- the activating rod is an angled rod approximately in the shape of a crankshaft which has at least:
  a first longitudinal horizontal part pivoting mounted on the mobile section of the slide rail,
  a second longitudinal horizontal part sliding mounted in a groove constituting the first guide path,
  and a third longitudinal horizontal part which is not aligned with the first longitudinal horizontal part and which engages with the activating component of the catch;
- the slider is movable beyond its neutral position by moving away from its active position, to a position where the activating component is held in its down position so long as a pre-specified force is not exerted on the slider in the direction of the active position of said slider;

the slide rail comprises at least two catches which can be moved simultaneously by means of the activating component controlled by the slider.

Furthermore, the object of the invention is also a seat comprising a seat part carried by two parallel slide rails as defined above, and wherein the means for moving the sliders of the two slide rails include:

two rigid transverse rods which extend parallel to each other between the two slide rails and which are each connected to the slider of one of the slide rails, and means to move the two rods respectively in the direction of the corresponding slide rails to push the sliders back into their active position.

To advantage, the two rods are acted upon resiliently so as to be each separated from the corresponding slide rail, also pulling the corresponding slider to its neutral position.

BRIEF DESCRIPTION OF THE DRAWINGS

Other characteristics and advantages of the invention will emerge from the following description of two of its versions, given as non-restrictive examples, in relation to the appended drawings.

In the drawings:

FIG. 1 is a diagrammatic view of a seat including a seat part mounted on slide rails according to a first version of the invention, FIG. 2 is a perspective view showing the slide rails of the seat in FIG. 1, FIG. 4 is a transverse sectional view of one of the slide rails in FIG. 2, in the neutral position, FIG. 5 is a perspective detail view, showing one of the catches of the slide rail in FIG. 4, FIG. 6 is an exploded perspective view, showing the operating mechanism of the catches of the slide rail in FIG. 4, FIG. 8 is a view similar to FIG. 4, showing the slide rail during the adjustment of the longitudinal position of the seat.

MORE DETAILED DESCRIPTION

Figure 3:
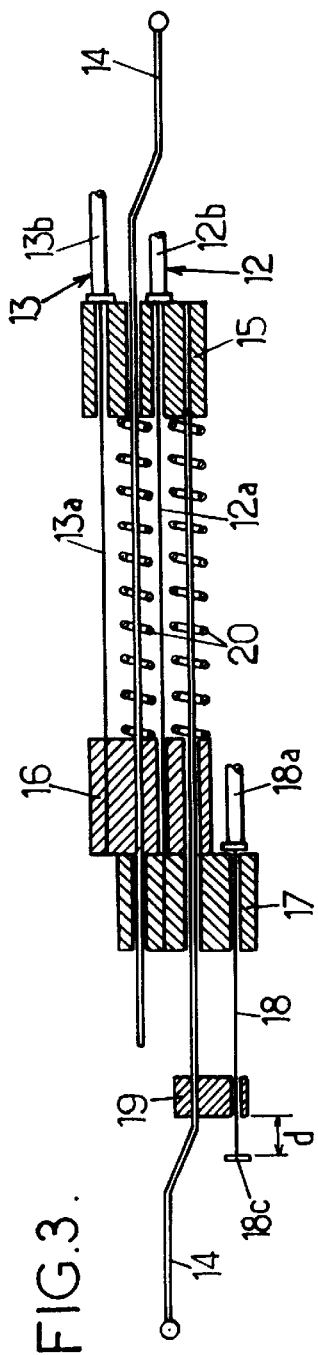
FIG. 3 is a diagrammatic sectional view of the control device which allows the slide rails in FIG. 2 to be unlocked, this control device being shown in the neutral position.

In the different figures the same references denote identical or similar components.

FIG. 1 shows a vehicle seat 1, particularly an automobile vehicle front seat, which comprises a back part 2 pivoting mounted on a seat part 3, around a transverse horizontal axis X, the seat part being itself supported by two parallel slide rails 4 fixed to the floor 5 of the vehicle.

Each slide rail 4 comprises, on the one hand, a fixed section 6 which is fixed to the floor 5 of the vehicle, and on the other hand, a mobile section 7 which is fixed to the seat part of the seat and which is sliding mounted along the fixed section in a longitudinal direction L.

Each slide rail 4 is normally locked in position, as will be explained below, and the two slide rails may be simultaneously unlocked by the activation of a handle 8 in the direction of the arrow 9, so as to allow the longitudinal position of the seat 1 to be adjusted.

Moreover, in the example considered, the seat 1 additionally comprises a handle 10 which can be activated in the direction of the arrow 11 to allow the seat back 2 to be folded down forwards and the seat part 3 to slide also forwards, particularly to allow a vehicle user to gain access to the space located behind the seat 1 in the case of a front seat of a two-door automobile vehicle.

Activating the handle 8, and folding the seat back 2 down forwards, respectively tensions two sheathed cables, which can be clearly seen in FIG. 2, namely:

on the one hand, a cable 12a for adjusting the longitudinal position of the seat, belonging to a cable transmission device 12 or a control cable unit activated by the handle 8, and on the other hand, a cable 13a for accessing the seats at the rear, belonging to a cable transmission device 13 or a control cable unit activated by folding down the seat back 2.

These two cables, 12a, 13a activate a control device, which can be clearly seen in FIGS. 2 and 3, and which comprises:

two rigid horizontal rods 14, which extend transversally between the two slide rails 4, a first rigid block 15 which is fixed to the external sheaths 12b, 13b of the cables 12a, 13a, the first block also being fixed to one of the rods 14 and being passed through in a sliding way by the other rod 14, and by the two cables 12a, 13a, a second rigid block 16 which is fixed to the cable 13a and to the rod 14 which slides in the first block 15, this second block 16 being passed through in a sliding way by the cable 12a and by the rod 14 which is fixed to the first block 15, a third rigid block 17 which is fixed to the cable 12a and which is passed through in a sliding way by the two rods 14, this third block being also fixed to the sheath 18b of a sheathed cable 18a of a cable transmission device 18 or control cable unit, the cable 18a passing through the third block 17 in a sliding way, and the third block 17 being placed against the second block 16, on the opposite side from the first block 15, a fourth rigid block 19 fixed to the rod 14 which is integral with the first block 15, the fourth block 14 being passed through in a sliding way by the cable 18a, which cable ends with a widened head 18c which is normally located at a certain distance d greater than zero from the fourth block 19, the fourth block 19 being placed between the third block 17 and one of the slide rails 4, on the opposite side from the first and second blocks, and two springs 20 which are placed between the first and second blocks 15, 16 tending to separate them from each other.

As can be seen in FIG. 2, the cable 18a is connected furthermore to a small rod 21 which is pivoting mounted around a vertical axis on the mobile section 7 of one of the slide rails, the sheath 18b of the cable 18a being furthermore fixed to a rigid support 21a integral with said mobile section 7.

The small rod 21 is integral with a vertical activating pin 21b, placed laterally relative to the slide rail 4 considered, opposite a memory retaining runner 22 which is sliding mounted in the longitudinal direction L, along a selector strip 23 fixed laterally to the fixed section 6 of the slide rail 4 in question. The memory retaining runner 22 is normally locked on the selector strip 23.

Furthermore, the two rods 14 of the control device each end with an angled end 14a which extends in the longitudinal direction L and which drives an operating mechanism 24 mounted on the mobile section 7 of the corresponding slide rail.

As shown in FIGS. 4 and 6, the operating mechanism 24 comprises:

- a guide 25, which may be made for example of plastic material and which is fixed to the mobile section 7 of the slide rail, this guide 25 comprising two parallel vertical flanges 26 which extend transversally relative to the longitudinal direction L, the two flanges 26 comprising respectively two vertical slots 27 mutually aligned in the longitudinal direction L,
- a slider 28, which may be made for example of plastic material and which is sliding mounted in the guide 25, between the two flanges 26, so as to be able to move only transversally, the slider 28 being passed through by a slot 29 which extends at an angle relative to the horizontal in a transverse vertical plane, the slider 28 being connected in a pivoting way to the angled end 14a of one of the rods 14,
- and a rigid activating rod 30, made for example of metal, which extends in the longitudinal direction and which passes through the two slots 27 and the slot 29.

The inclined slot 29 of the slider is inclined upwards moving away from the corresponding rod 14, and this rod 14 is pulled resiliently by the springs 20 towards the intermediate space located between the two slide rails 4, so that in the neutral position, the activating rod 30 is in an up position, as shown in FIG. 4.

In this position, the activating rod 30 does not interfere with the catches 31 of the slide rail, catches which are two in number per slide rail (see FIG. 2).

As shown in detail in FIGS. 4 and 5, each catch 31 is a metal part which comprises:

- a vertical rod 32 which passes in a sliding way through, on the one hand the upper web 33 of the mobile section 7 of the corresponding slide rail, and on the other hand, a support U bolt 34 fixed under said upper web, a helical spring 35 being mounted between the U bolt 34 and a collar 36 belonging to the rod 32 so as to pull said rod upwards,
- and a lower horizontal plate 37 which comprises lateral teeth 38 extending in the transverse direction, which teeth pass through recesses 39 provided in the mobile section 7 and engage with complementary teeth 40 formed on the lower end of a reflex flange 41 of the fixed section 6, on either side of the mobile section.

The device which has just been described operates as follows.

Figure 7:
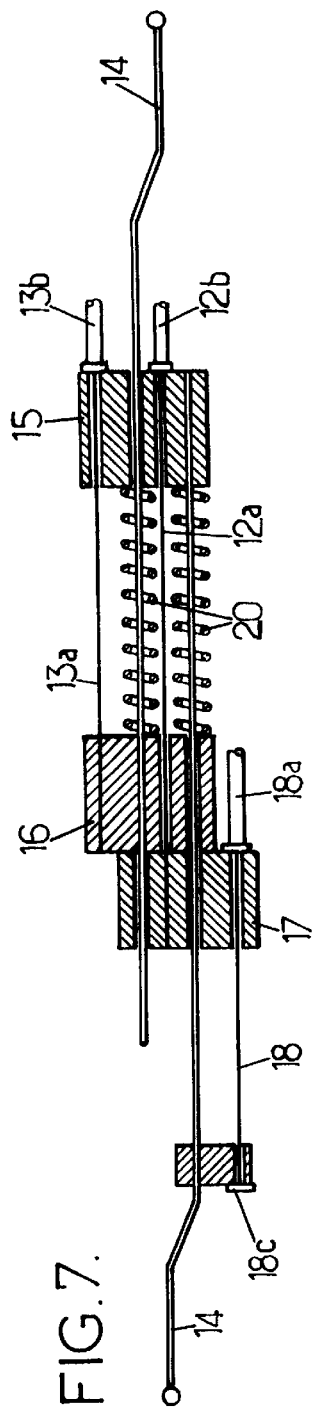
FIG. 7 is a view similar to FIG. 3, showing the position of the control device during the adjustment of the longitudinal position of the seat.

When a user activates the handle 8 in the direction 9 (FIG. 1), this causes tension in the cable 12a fixed to the third block 17 of the control device (FIG. 7), which brings the first and third blocks 15, 17 closer to each other, and the third block 17 brings with it the second block 16 compressing the springs 20.

Thus, the angled ends 14a of the two rods 14 are each moved in the direction of the corresponding slide rail 4.

Moreover, owing to the movement in the reverse direction of the third block 17 and of the rod 14 integral with the fourth block 19, each over a distance d' greater than d/2 and at the most equal to d, the widened head 18c of the cable 18a abuts against the fourth block 19 which pulls on the cable 18a activating the small rod 21, so that the activating pin 21b of this small rod acts on the memory retaining runner 22 so as to unlock this runner and to cause this runner to be driven by the mobile section 7 of the corresponding slide rail.

Furthermore, the movement of the rods 14 moves each slider 28 outwards from the seat, to an active position shown in FIG. 8, where the activating rod 30 of each slide rail is in correspondence with the lowest part of the inclined slot 29 of the corresponding slider, so that said activating rod is moved downwards and acts on the rods 32 of the catches, so that the teeth 39 of said catches no longer engage with the teeth 40 of the fixed section of the slide rail (FIG. 8).

The mobile sections 7 of the two slide rails may then slide longitudinally with the seat part of the seat relative to the fixed sections 6.

When the handle 8 is released by the user, the whole device returns to its neutral position, and the slide rails are again locked whereas the memory retaining runner 22 locks again on the selector strip 23.

Furthermore, when the seat back 2 is folded down forwards by activating the handle 10, the cable 13a acts on the second block 16 of the control device so as to bring the first and second blocks 15, 16 closer to each other without moving the third block 17.

Thus, the two rods 14 are pushed back outwards by the distance d', as previously, by acting on the sliders 28.

During this motion, the fourth block 19 recovers a part of the distance d which separates it from the widened head 18c of the cable 18a, but because the third block 17 is immobile, this distance d is not completely recovered or is only just recovered and the cable 18a is not subject to any tension, so that the memory retaining runner 22 remains locked on the selector strip 23.

The slide rails 4 are then both unlocked as previously explained, and the seat part 3 of the seat may be moved:

- to the maximum forward position to allow a user to gain access to the seats at the rear of the vehicle,
- then again backwards until the mobile section 7 of the slide rail which carries the memory retaining runner 22 abuts against this memory retaining runner, which corresponds to the initial longitudinal position of the seat part 3.

Figure 9:
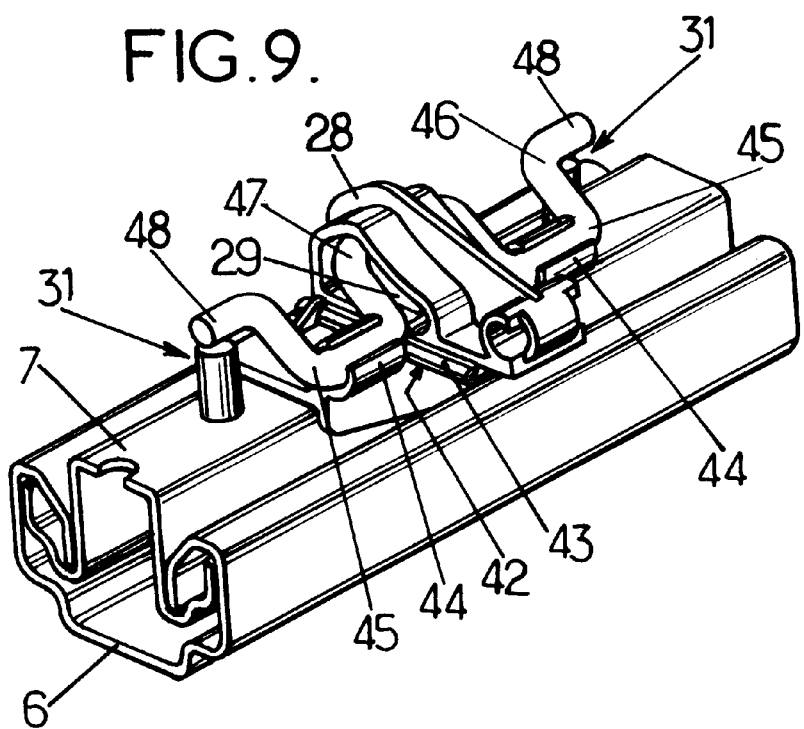
FIG. 9 is a diagrammatic perspective view showing a slide rail according to a second version of the invention.

Furthermore, in the second version of the invention, shown in FIG. 9, only the slot 29 of the slider 28, the slider guide and the activating rod moved by this slider are different from the previously described components.

First of all, the guide 42 of the slider no longer comprises vertical flanges or slot, but only hooks 43 between which the slider 28 is guided.

Moreover, the guide 42 comprises two bearings 44 in which are pivoting mounted two longitudinal rectilinear parts 45 of the metal activating rod 46.

This activating rod 46 has approximately the shape of a crankshaft, and comprises, in addition to the two rotating parts 45:

- a longitudinal central part 47 which is placed inside the slot 29 of the slider 28,
- and two lateral longitudinal parts 48 which are placed above the rods 32 of the catches 31 to act on them when the slider is in its active position.

Figure 10:
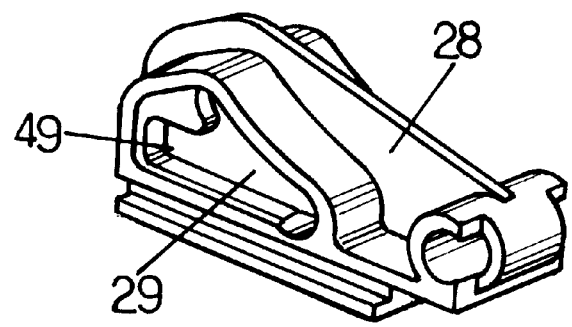
FIG. 10 is a perspective view showing the slider of the slide rail in FIG. 9.

Furthermore, as can be seen in FIG. 10, the slot 29 of the slider 28 is inclined as in the previously described example, but additionally comprises a horizontal branch 49 which is placed approximately at the level of the low part of said slot 29 and which extends this slot 29 beyond the highest part of said slot.

Thus, when the slide rails 4 are assembled, the central part 47 of the rod 46 may be engaged in the horizontal branch 49 of the slot 29, by pushing the slider 28 back to the maximum inwards to the seat while keeping, by an external action, the activating rod 46 in its down position. The catches 31 are then locked in the unlocked position, which makes it easier to assemble the slide rails.

When the slide rails 4 have been assembled, the slider 28 is pushed back outwards from the seat to return to its normal neutral position, so that the rod 46 is then disengaged from the branch 49 of the slot 29.

Clearly, this last arrangement could also be implemented in the first version of the invention, previously described.

Furthermore, in all the versions of the invention, the shape of the slot 29 may be modulated as a function of the kinematics required for the movement of the activating rod 30 or 46.

In particular, the slot 29 may, as required, be either curved as shown in the drawings, or rectilinear.

We claim:

1. A slide rail for a vehicle seat, comprising:
   a fixed section which extends in a so-called longitudinal direction and which is intended to be fixed to the floor of the vehicle,
   a mobile section, which is intended to be fixed to the seat part of the seat and which is sliding mounted along the fixed section in said longitudinal direction,
   at least one catch which is mounted on the mobile section and which is movable between, on the one hand, a locked position wherein said catch engages with the fixed section to lock the mobile section, and on the other hand, an unlocked position wherein said catch does not engage with the fixed section and allows the mobile section to slide, the catch being biased resiliently to its locked position, and said catch comprising at least one activating part which is movable approximately vertically when the catch is moved between its locked and unlocked positions,
   and an operating mechanism engaging with the activating part of the catch, this operating mechanism being able to be activated to move the catch at least to its unlocked position,
   wherein the operating mechanism of the catch comprises at least:
      one slider which is sliding mounted horizontally on the mobile section along a transverse direction relative to said longitudinal direction, between a neutral position and an active position,
      one activating component which is movable at least vertically between on the one hand, an up position where said activating component allows the catch to be put into its locked position, and on the other hand, a down position where said activating component acts on the activating part of the catch to put said catch into its unlocked position, this activating component being connected mechanically simultaneously with the mobile section and with the slider, so that the activating component is in its up position when the slider is in its neutral position, and so that said activating component is in its down position when the slider is in its active position,
      and means to act horizontally on the slider so as to move it between its neutral position and its active position.

2. A slide rail according to claim 1, wherein the operating mechanism additionally comprises a first non horizontal guide path which is fixed to the slider and along which the activating component slides, the first guide path being configured so that the activating component is in its up position when the slider is in its neutral position, and so that said activating component is in its down position when the slider is in is active position.

3. A slide rail according to claim 2, wherein the operating mechanism additionally comprises a guide which is fixed to the mobile section and which includes a second guide path not horizontal and not parallel to the first guide path, the activating component being sliding mounted simultaneously along first and second guide paths.

4. A slide rail according to claim 3, wherein the first guide path extends at an angle relative to the horizontal, whereas the second guide path extends approximately vertically.

5. A slide rail according to claim 3, wherein the first and second guide paths are grooves provided respectively in the slider and in the guide, the activating component being in the form of an activating rod penetrating simultaneously into the grooves constituting the first and second guide paths, and this activating rod being placed so as to support the activating part of the catch at least when said activating rod is in its down position.

6. A slide rail according to claim 5, wherein the activating rod is a rectilinear rod which extends approximately horizontally in the longitudinal direction.

7. A slide rail according to claim 5, wherein the activating rod is an angled rod approximately in the shape of a crankshaft which has at least:
   a first longitudinal horizontal part pivoting mounted on the mobile section of the slide rail,
   a second longitudinal horizontal part sliding mounted in a groove constituting the first guide path,
   and a third longitudinal horizontal part which is not aligned with the first longitudinal horizontal part and which engages with the activating part of the catch.

8. A slide rail according to claim 5, wherein the slider is movable beyond its neutral position by moving away from its active position, to a position where the activating component is held in its down position so long as a prespecified force is not exerted on the slider in the direction of the active position of said slider.

9. A slide rail according to claim 1, comprising at least two catches which can be moved simultaneously by means of the activating component controlled by the slider.

10. A seat comprising a seat part carried by two parallel slide rails, each of said slide rails comprising:
   a fixed section which extends in a so-called longitudinal direction and which is intended to be fixed to the floor of the vehicle,
   a mobile section, which is intended to be fixed to the seat part of the seat and which is sliding mounted along the fixed section in said longitudinal direction,
   at least one catch which is mounted on the mobile section and which is movable between, on the one hand, a locked position wherein said catch engages with the fixed section to lock the mobile section, and on the other hand, an unlocked position wherein said catch does not engage with the fixed section and allows the mobile section to slide, the catch being biassed resiliently to its locked position, and said catch comprising at least one activating part which is movable approximately vertically when the catch is moved between its locked and unlocked positions,
   and an operating mechanism engaging with the activating part of the catch, this operating mechanism being able to be activated to move the catch at least to its unlocked position, wherein the operating mechanism of the catch of each slide rail comprises at least:
- one slider which is sliding mounted horizontally on the mobile section along a transverse direction relative to said longitudinal direction, between a neutral position and an active position,
- one activating component which is movable at least vertically between on the one hand, an up position where said activating component allows the catch to be put into its locked position, and on the other hand, a down position where said activating component acts on the activating part of the catch to put said catch into its unlocked position, this activating component being connected mechanically simultaneously with the mobile section and with the slider, so that the activating component is in its up position when the slider is in its neutral position, and so that said activating component is in its down position when the slider is in its active position,
- and means to act horizontally on the slider so as to move it between its neutral position and its active position, and wherein the means for moving the sliders of the two slide rails include:
- two rigid transverse rods which extend parallel to each other between the two slide rails and which are each connected to the slider of one of the slide rails,
- and means to move the two rods respectively in the direction of the corresponding slide rails to push the sliders back into their active position.

11. A seat according to claim 10, wherein the two rods are acted upon resiliently so as to be each separated from the corresponding slide rail, also pulling the corresponding slider to its neutral position.

* * * * *